US00RE43814E

(19) United States
(12) Reissued Patent
Itagaki

(10) Patent Number: US RE43,814 E
(45) **Date of Reissued Patent: *Nov. 20, 2012**

(54) IMAGE FORMING APPARATUS AND CONTROL METHOD FOR THE SAME

(75) Inventor: Tomohisa Itagaki, Abiko (JP)

(73) Assignee: Canon Kabushiki Kaisha (JP)

( * ) Notice: This patent is subject to a terminal disclaimer.

(21) Appl. No.: 13/095,562

(22) Filed: Apr. 27, 2011

Related U.S. Patent Documents

Reissue of:
(64) Patent No.: 7,783,214
Issued: Aug. 24, 2010
Appl. No.: 12/388,233
Filed: Feb. 18, 2009

U.S. Applications:
(63) Continuation of application No. 11/366,366, filed on Mar. 2, 2006, now Pat. No. 7,509,065.

(30) Foreign Application Priority Data

Mar. 2, 2005 (JP) ..... 2005-057745

(51) Int. Cl.
*G03G 15/00* (2006.01)
(52) U.S. Cl. ..... 399/49; 399/72
(58) Field of Classification Search ..... 399/49, 399/72
See application file for complete search history.

(56) References Cited

U.S. PATENT DOCUMENTS

| | | | | |
|---|---|---|---|---|
| 7,307,752 | B1 | 12/2007 | Mestha et al. | |
| 2002/0176102 | A1 | 11/2002 | Denton et al. | |
| 2005/0135822 | A1 | 6/2005 | Nakagawa | |
| 2005/0244177 | A1 | 11/2005 | Iwakawa | |
| 2006/0164506 | A1 | 7/2006 | Kitao | |
| 2006/0170754 | A1* | 8/2006 | Kitao | 347/116 |

FOREIGN PATENT DOCUMENTS

| | | | |
|---|---|---|---|
| JP | 62-296669 | A | 12/1987 |
| JP | 63-185279 | A | 7/1988 |
| JP | 1-309082 | A | 12/1989 |
| JP | 04-55868 | A | 2/1992 |
| JP | 05257353 | A | 10/1993 |
| JP | 10-193689 | A | 7/1998 |
| JP | 11-231585 | A | 8/1999 |
| JP | 2000-134418 | A | 5/2000 |
| JP | 2000-241242 | A | 8/2000 |
| JP | 2002-344759 | A | 11/2002 |
| JP | 2003-131466 | A | 5/2003 |
| JP | 2004-177507 | A | 6/2004 |
| JP | 2006-053305 | A | 2/2006 |
| JP | 2006047406 | A | 2/2006 |
| JP | 2006053305 | A | 2/2006 |

* cited by examiner

*Primary Examiner* — Ryan Walsh
(74) *Attorney, Agent, or Firm* — Rossi, Kimms & McDowell LLP

(57) ABSTRACT

An image forming apparatus that is capable of generating highly accurate read timing of a patch image, thereby achieving highly accurate density adjustment and improving color stability. A patch image for color adjustment is read in read timing generated when a trigger bar is detected. The patch image and the trigger bar that are to be read by a color sensor are formed on a transfer material. Image formation is executed by a printer controller in an image forming condition set differently for the trigger bar and for the patch image.

7 Claims, 10 Drawing Sheets

DENSITY MAXIMUM ADJUSTMENT PATTERN

DENSITY MAXIMUM ADJUSTMENT PATTERN

PHOTODIODE OUTPUTS FOR BK PART

DENSITY MAXIMUM ADJUSTMENT PATTERN

PHOTODIODE OUTPUTS FOR BK PART

IMAGE FORMING APPARATUS AND CONTROL METHOD FOR THE SAME

Matter enclosed in heavy brackets [ ] appears in the original patent but forms no part of this reissue specification; matter printed in italics indicates the additions made by reissue.

This is a continuation of U.S. patent application Ser. No. 11/366,366 filed Mar. 2, 2006 now U.S. Pat. No. 7,509,065.

BACKGROUND OF THE INVENTION

1. Field of the Invention

This invention relates to an image forming apparatus for a printer or a copying machine which forms an image using techniques such as an electronic photographic technique or an inkjet technique, and a control method of the image forming apparatus.

2. Description of the Related Art

In recent years, there is increasing demand for direct imaging printer which does not need a printing plate used in off-set printing or the like. Many companies use direct imaging printers in order to reduce time required for printing, realize services adapted for individual customers, satisfy the demand for mass-printing, and address environmental problems involving discard of sheets with printing errors. Among the direct imaging printers, the ink jet printer suitable for photographic printing, which is advantageous in prices, and the electronic photographic printer, which is high in productivity and near to the offset printing in quality, are increasing in market share.

Under these circumstances, the most important function among those functions required for a direct imaging printer as an alternative to conventional offset printing or photograph is to maintain stability of colors of an image formed on a sheet.

In order to ensure stability of colors, various manufacturers have proposed techniques which enable a direct imaging printer to carry out color stabilizing control (without intervention by a control of an external device such as a computer). More specifically, there is disclosed a technique in which a pattern of a toner patch image for use in detecting toner density is formed on a surface of a photosensitive member in an electronic photographic printer and is read by a density sensor, and the resultant reading information is fed back from the density sensor to a toner density controller of a developing unit that carries out control so as to produce the appropriate toner density (for example, see Japanese Laid-Open Patent Publication (Kokai) No. H01-309082).

Although the toner patch image is generally easily formed and cleared, only toner density information before the toner image is fixed on a sheet can be obtained. Therefore, when the toner density control is executed based on the toner density information, influences after the fixing process cannot be reflected on the toner density control.

Thus, in a copying machine, for example, there has been proposed a method for causing a reader unit provided in the body of a copying machine (printer unit) to read an image formed on an output sheet by a printer unit, and for performing an image control based on the result of image reading (for example, see Japanese Laid-Open Patent Publications (Kokai) Nos. S62-296669 and S63-185279). With this method, however, a user is required to perform complicated operation such as picking up an output sheet, on which an image is formed by the printer unit, from a sheet discharge section, feeding the output sheet in the reader unit, and setting the reader unit to be ready for image reading. Because of the complexity of operation, some users omit the operation which should be done periodically.

In order to eliminate the complexity of operation, there has been disclosed a technique of setting a sensor in the midway of a conveying path extending downstream of a fixing device for fixing a toner image on a sheet, and detecting an output image formed on the sheet (toner patch image) (for example, see Japanese Laid-Open Patent Publications (Kokai) Nos. H10-193689, H11-231585, and 2000-241242). Further, there has been disclosed another technique in which achromatic color balance (gray balance) to which human eyes are sensitive is adjusted based on output image's color (R, G, B) being detected (for example, see Japanese Laid-Open Patent Publication (Kokai) No. 2002-344759).

On the other hand, the ink jet printer has a problem that colors of inks printed on a sheet vary, though not so much as in the electronic photographic printer, due to variation in the amount of discharged ink with passage of time, differences in environment, or individual differences between ink cartridges. Therefore, also in the field of ink jet printers, a printer has been put on the market, which has a density sensor disposed next to an ink head so that the color stability after the ink is printed on a sheet may be recognized and controlled with accuracy.

As described above, in the direct imaging printer, the most important problem is to maintain color stability irrespective of whether the printer is based on the electronic photographic technique or the ink jet technique. Printer manufacturers must guarantee the color stability for users. It is important for printer manufactures to commercialize products produced not only in consideration of technical improvements but also in consideration of users' operability. Attention is much focused on the color stabilizing control of an output image with use of a sensor disposed on a conveying path extending downstream of the fixing device.

However, the arrangement for executing the color stabilizing control of an output image using a sensor set, as in the above-mentioned prior art example, on a conveying path on the side downstream of the fixed device entails the following problems.

If, in an electronic photographic printer, a toner patch image is detected before the image has been fixed on a sheet, reading timing of toner patch image can be determined based on writing timing in which an electrostatic latent image is formed by laser to the photosensitive member. If, on the other hand, a toner patch image is detected after it has been fixed on a sheet by, for example, detecting the toner patch image when a predetermined time has elapsed from the completion of the toner patch image being fixed, erroneous detection may sometimes be caused in a sensor disposed downstream of the fixing device depending on timing of the sheet to enter a sensing area of the sensor, expansion and/or skewing of a sheet.

In order to prevent the above-mentioned erroneous detection, the inventors of the present invention study a method for generating a read timing of a toner patch image by sensors, as described below.

First, an explanation will be given of a case where a maximum density adjustment pattern (toner patch image) is read by a color sensor without using a trigger bar (a band arranged on the left side of the toner patch image), as shown by way of example in FIG. 11A.

In order to generate read timing of a color sensor without using a trigger bar, read timing may be generated with use of a flag (contact) type sensor or an optical sensor used for sheet jam detection. This detection method is, however, affected by a variation in the location of a toner patch image originally formed on a sheet. Considering a cost, although a trigger may be generated on the basis of the result of detection by the color sensor, the above-mentioned problem cannot be solved in this case.

Next, a case where read timing in which a toner patch image formed on a sheet (medium) is read by a color sensor is generated using the density or color contrast of the toner patch image, as a trigger will be described.

An image formation at one end of a maximum density adjustment pattern as exemplarily shown in FIG. 11A should be carried out in a condition using much color material (toner) for strengthening a color contrast compared to that at another end of the pattern. In order to absorb a variation in sheet conveying speed, the toner patch image needs to be bigger in size. This results in a low flexibility in placing the toner patch image on a sheet, and a variation in the color contrast of toner patch image serving as a trigger for the reading action of the color sensor, making it difficult to adapt to detection of a gradation pattern including many low-density pattern portions or to control to determine the amount of color material to be put on the toner patch image by the printer engine.

Next, a method will be described in which the read timing of a color sensor can be generated in the most well-balanced manner using a trigger bar.

This method is effective to relive a weak point in the mechanism of an image forming device such as insufficient sheet registration accuracy (sheet transfer position accuracy) or the presence of variation in sheet conveying speed. In the method, however, if a contrast ratio between a trigger bar and a sheet is less than a certain value, accurate read timing of a color sensor cannot be attained. Since such trigger bar is formed, the number of toner patch images which can be formed on a sheet decreases. A bordering part of toner patch image cannot be detected with accuracy. In particular, in the case of performing control to determine how much amount of color material is to be put on each toner patch image, image formation is carried out while changing an image forming condition for attaining the maximum toner density, and therefore, the trigger bar cannot be formed stably.

A role of a color sensor mounted on the image forming apparatus is to match the maximum toner density and a toner gradation, as described in the above-mentioned Japanese Laid-Open (Kokai) Patent Publications Nos. H01-309082, S62-296669, and S63-185279. When the maximum density is matched to the image forming condition (such as a charged potential of photosensitive member), it is enough to change only development contrast (difference between a potential for forming electrostatic latent image on a photosensitive member and a bias potential). Generally, the development contrast can be changed only by changing the charged potential of photosensitive member with keeping the amount of light or by changing the amount of light with keeping the charged potential of photosensitive member. Changing the amount of light, the latter method, is faster in response and more suitable for color stabilizing control. Thus, many companies are adopting the latter method. In considering color stabilizing control, however, the above-mentioned concept for trigger generation is difficult to be realized.

Namely, if a toner patch image is formed in stages with changing the amount of light in a detected part of the toner patch image, the trigger bar must be formed in the toner patch image with a low amount of light. As a result, as shown in FIG. 11B, a problem occurs in that a color sensor cannot detect any toner patch image in suitable timing.

SUMMARY OF THE INVENTION

It is an object of the present invention is to provide an image forming apparatus and a control method therefor that are capable of generating highly accurate read timing of a patch image, thereby achieving highly accurate density adjustment and improving color stability.

To attain the above object, in a first aspect of the present invention, there is provided an image forming apparatus comprising a detecting device that reads at least one patch image for color adjustment of at least one image forming material in read timing generated when at least one trigger bar is detected, an image forming device that forms the patch image and the trigger bar to be read by the detecting device on an image forming medium, and a controlling device that causes the image forming device to execute image formation in an image forming condition set differently for the trigger bar and for the patch image.

Preferably, the image forming condition of the trigger bar is a condition in which the trigger bar is formed to have a lightness not higher than a predetermined lightness.

Preferably, the image forming condition of the trigger bar is a condition in which the trigger bar is formed using at least one image forming material different from at least one image forming material used for the patch image.

Preferably, the image forming condition of the trigger bar is a condition in which an amount per unit area of the image forming material used for the trigger bar is different from that of the image forming material used for the patch image.

Preferably, the image forming condition of the trigger bar is a condition in which the trigger bar is formed using a plurality of color image forming materials.

More preferably, the plurality of color image forming materials are image forming materials that are selected in order of low to high lightness.

Preferably, the image forming condition of the trigger bar is a condition in which the trigger bar is formed in an image processing pattern different from that in which the patch image is formed.

More preferably, the image processing pattern of the trigger bar provides image density that is higher than that provided by the image processing pattern of the patch image.

Preferably, when a maximum density of the image-forming material is determined, the image forming device forms patch images having different densities based on an electrophotographic technique, while changing laser power in stages, and the controlling device determines laser power at which the maximum density is attained based on read results of the patch images by the detecting device.

Preferably, when a maximum density of the image forming material is determined, the image forming device forms patch images having different color densities based on an electrophotographic technique, while changing a degree of laser modulation in stages, and forms the trigger bar using laser whose degree of modulation differs from degrees of laser modulation used for formation of the patch images.

To attain the above object, in a second aspect of the present invention, there is provided a method for controlling an image forming apparatus comprising a detecting device that reads at least one patch image for color adjustment of at least one image forming material in read timing generated when at least one trigger bar is detected, the controlling method comprising an image forming step of forming the patch image and the trigger bar to be read by the detecting device on an image forming medium, and a controlling step of controlling image formation in the image forming step to be performed in an image forming condition set differently for the trigger bar and for the patch image.

According to the present invention, an image forming condition of a trigger bar for causing a detecting device to generate read timing of at least one patch image is set so as to be different from an image forming condition of the patch image. Specifically, the trigger bar is formed to have a lightness not higher than a predetermined lightness. The trigger bar is formed using at least one image forming material different from at least one color material used for the patch image. The trigger bar is formed in a condition in which the amount of per unit area of the image forming material used for the trigger bar is different from that of the image forming material used for the patch image. The trigger bar is formed using a plurality of color image forming materials which are selected in the order of low to high brightness. This makes it possible to generate highly accurate read timing of a patch image by the detecting device, thus achieving highly accurate toner density adjustment. As a result, color stability in the image forming apparatus can be improved.

When the maximum density of the image forming material is determined, the image forming device forms a plurality of patch images while changing laser power in stages, and the controlling device determines laser power at which the maximum density is attained based on read results of the patch images by the detecting device. Thus, it is possible to ensure the required lowest lightness of the patch image, enabling the detecting device to generate reliable read timing of patch image and also enables a highly accurate toner density adjustment without affected by characteristics of an edge part of the patch image.

The above and other objects, features, and advantages of the invention will become more apparent from the following detailed description taken in conjunction with the accompanying with drawings.

DETAILED DESCRIPTION OF THE PREFERRED EMBODIMENTS

The present invention will now be described in detail with reference to the drawings showing preferred embodiments thereof.

Figure 1:
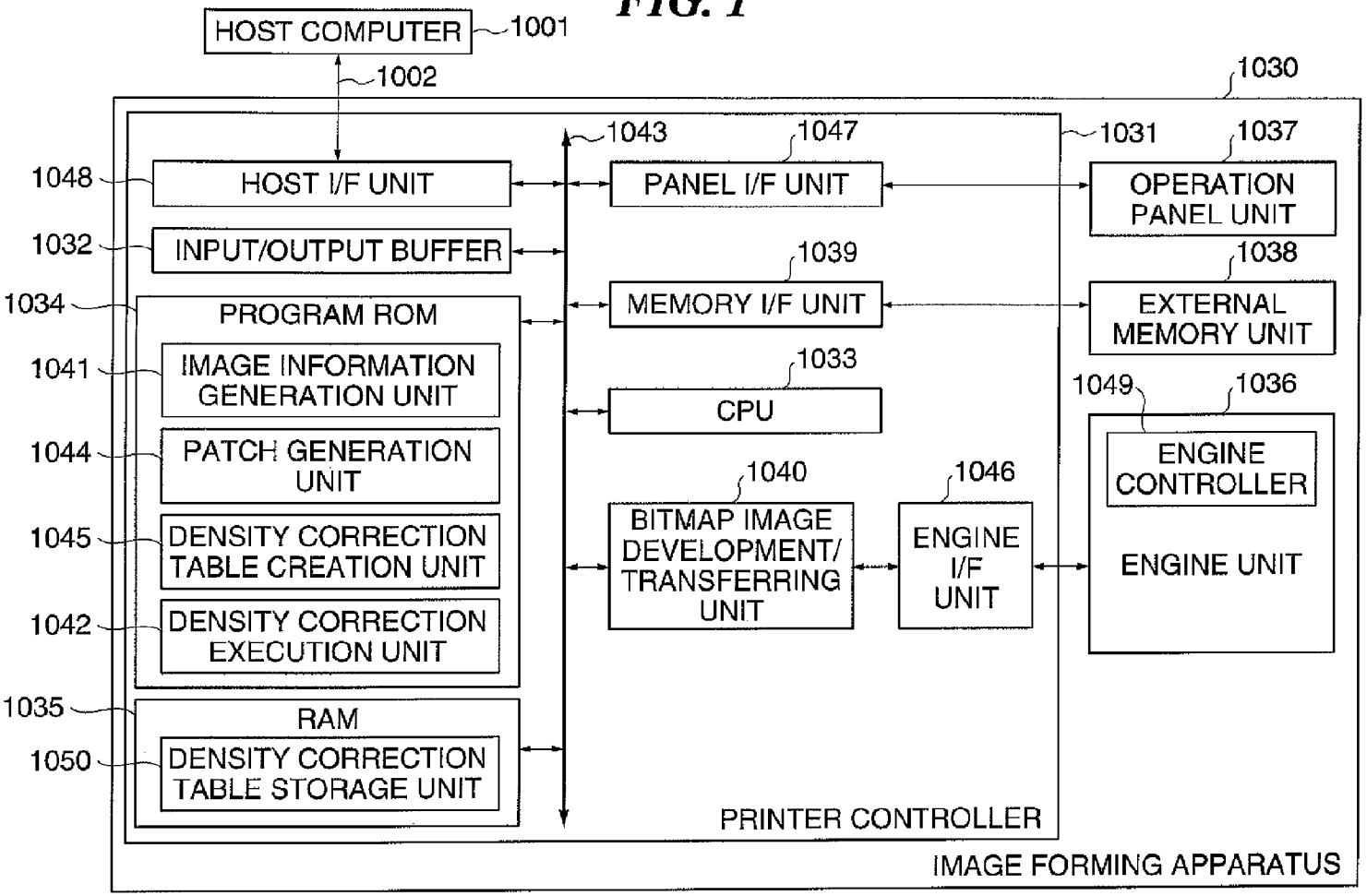
FIG. 1 is a block diagram schematically showing the construction of a substantial part of an image forming apparatus according to a first embodiment of the present invention.

FIG. 1 is a block diagram schematically showing the construction of a substantial part of an image forming apparatus according to a first embodiment of the present invention.

In the present embodiment, a control method of an image forming apparatus will be described, in which trigger bars of new concept and toner patch images are formed on a transfer material in a plurality of colors and an accurate read timing of toner patch images for a color sensor is generated, the color sensor being disposed on a conveying path located downstream of a fixing device.

Further, in the present embodiment, an electronic photographic image forming apparatus will be described by way of example. An ink jet image forming apparatus and an sublimation image forming apparatus also have the same problems as in the electronic photographic image forming apparatus, however such problems can be solved by the control method described below. That is to say, the present invention can be applied to various types of image forming apparatuses and methods including an electronic photographic apparatus, an ink jet apparatus, a sublimation apparatus, and methods therefor.

In FIG. 1, an image forming apparatus 1030 is designed as a color laser beam printer (copying machine) for forming an image utilizing an electronic photograph technique, for example. The image forming apparatus 1030 includes a printer controller 1031 for controlling the entire image forming apparatus, an image forming apparatus engine unit (hereinafter referred to as engine unit) 1036 for controlling image forming operations, an operation panel unit 1037, and an external memory unit 1038. The image forming apparatus 1030 is connected with a host computer 1001 via a communication line 1002.

The printer controller 1031 includes a host interface (hereinafter referred to as I/F) unit 1048, an input/output buffer 1032, a program ROM 1034, a RAM 1035, a panel I/F unit 1047, a memory I/F unit 1039, a CPU 1033, a bitmap image development/transferring unit 1040, an engine I/F unit 1046, and a system bus 1043.

The host I/F unit 1048 controls input and output of data between the printer controller 1031 and the host computer 1001. The input/output buffer 1032 temporarily stores control codes exchanged between the printer controller 1031 and the host computer 1001 via the host I/F unit 1048 and data exchanged between the printer controller 1031 and various communication means. The CPU 1033 controls the entire of the printer controller 1031 and also performs various controls described later (potential control, maximum density adjustment control, gradation control, desired maximum density setting control, desired density gradation setting control). The CPU 1033 executes the process shown in the flowcharts of FIGS. 8 and 9 based on control program.

The program ROM 1034 stores a control program and control data executed and utilized in the CPU 1033, and includes modules (an image information generation unit 1041, a patch generation unit 1044, a density correction table creation unit 1045, and a density correction execution unit 1042). The image information generation unit 1041 generates various image objects based on the setting specified by data received from the host computer 1001. The patch generation unit 1044 generates a toner patch image used for measuring a toner density which is in turn used for toner density correction. The density correction table creation unit 1045 creates a density correction table based on results of the toner density measurement. The density correction execution unit 1042 executes the toner density correction.

The RAM 1035 is used as a work memory for process of calculations required for analyzing or printing the above-mentioned control codes and data received from the host computer 1001 or process of printing data. In addition to the work memory, the RAM 1035 also has a density correction table storage unit 1050 that stores a density correction table created by the above-mentioned density correction table creation unit 1045.

The bitmap image development/transferring unit 1040 develops an image object created at the image information generation unit 1041 into a bitmap image and transfers the developed bitmap image to the engine unit 1036. The engine I/F unit 1046 connects the printer controller 1031 to the engine unit 1036. The panel I/F unit 1047 connects the printer controller 1031 to the operation panel unit 1037. The memory I/F unit 1039 connects the printer controller 1031 to the external memory unit 1038. The system bus 1043 is a shared communication channel for connecting respective parts in the printer controller 1031.

The engine unit 1036 is for actually forming an image on a transfer material. The engine unit 1036 has an engine controller 1049 for controlling the engine unit 1036. The operation panel unit 1037 has an operation unit for giving instructions such as an instruction for setting the number of print copies/print magnification at the time of performing printing by the image forming apparatus and an instruction for start of printing. The operation panel unit 1037 also has a display unit for displaying setting information and the like. The external memory unit 1038 is used for storing printing data and various kinds of information on image forming apparatus.

Figure 2:
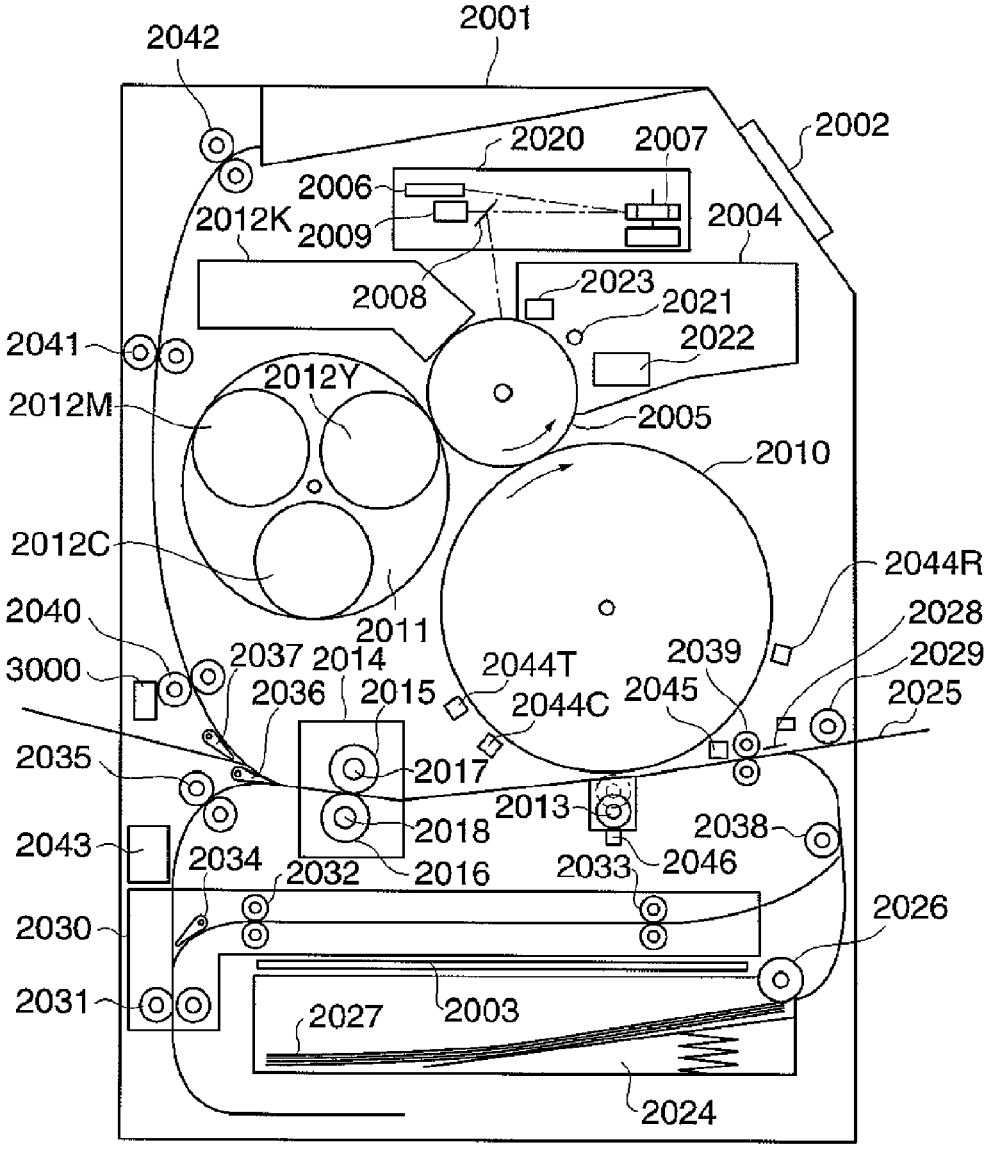
FIG. 2 is a diagram showing an internal structure of the image forming apparatus.

FIG. 2 is a diagram showing the internal structure of the image forming apparatus 1030.

In FIG. 2, the image forming apparatus 1030 includes a casing 2001 that accommodates a control board containing unit 2003 in which are received various devices forming the engine unit 1036, the engine controller 1049 for controlling image forming processes (for example, sheet feeding) performed by the just-mentioned devices, and the printer controller 1031.

As the devices forming the engine unit 1036, an optical processing device, a fixing device, a sheet feeding device, and a conveyance device are provided. These devices will be outlined below. The optical processing device forms electrostatic latent images on a photosensitive member (photosensitive drum) 2005 by laser scanning, develops the electrostatic latent images into visible images, multi-transfers the visible images to an intermediate transfer member 2010, and transfers the multi-transferred color images to a transfer material 2027. The fixing device fixes a toner image transferred to the transfer material 2027. The sheet feeding device feeds the transfer material 2027 to a transfer location or the like. The conveyance device conveys the transfer material 2027.

Next, the optical device will be described in detail. A laser driver 2006 on/off drives laser light emitted from a semiconductor laser (not shown) according to image data supplied from the printer controller 1031 at a laser scanner unit 2020. A rotary polygonal mirror 2007 turns the laser light emitted from the semiconductor laser in the scanning direction, leads the light to a photosensitive drum 2005 via a reflecting mirror 2008, and exposes the photosensitive drum 2005, which is charged by a primary charging device 2023, in the main scanning direction. In this manner, an electrostatic latent image can be formed on the photosensitive drum 2005.

The reflecting mirror 2008 is formed by a semi-transparent mirror with a beam detector 2009 placed on the back. The beam detector 2009 detects laser light. A detection signal corresponding to the detected laser light is supplied to the control board containing unit 2003. The engine controller 1049 in the control board containing unit 2003 generates a horizontal synchronizing signal for determining exposing timing in the main scanning direction based on the detection signal from the beam detector 2009. The horizontal synchronizing signal is outputted to the printer controller 1031.

The electrostatic latent image formed on the photosensitive drum 2005 is visualized into a toner image with toner supplied by a developing device to be described below. The visualized toner image on the photosensitive drum 2005 is transferred (primary transfer) onto the intermediate transfer member 2010, to which voltage with characteristics converse to the toner image is applied.

When a color image is formed, a developing rotary 2011 rotates once for each rotation of the intermediate transfer member 2010. Then, development process is executed in the order of a yellow developing device 2012Y, a magenta developing device 2012M, a cyan developing device 2012C, then a black developing device 2012K. Visible images in respective colors are formed in the order by yellow, magenta, cyan and black by four rotations of the intermediate transfer member 2010. In this manner, a full color visible image is formed on the intermediate transfer member 2010.

When a monochrome image is formed, development process is executed only by the black developing device 2012K. A black visible image is formed by one rotation of the intermediate transfer member 2010. In this manner, a monochrome visible image is formed on the intermediate transfer member 2010.

The photosensitive drum 2005 and the yellow developing device 2012Y, the magenta developing device 2012M, the cyan developing device 2012C and the black developing device 2012K are detachably mounted. The developing devices except for the black developing device 2012K are contained in the developing rotary 2011.

On the other hand, the sheet feeding device feeds a transfer material 2027, which was fed from a sheet feeding cassette 2024 and kept awaited in the resist shutter 2028, and a transfer roller 2013 presses the transfer material 2027 to the intermediate transfer member 2010, while applying bias, whose characteristics converse to the toner, to the transfer roller 2013. In this manner, visible images on the intermediate transfer member 2010 is transferred to the transfer material 2027, which is fed in synchronized in the sub-scanning direction, by the sheet feeding device (secondary transfer).

A cleaner 2022 removes remaining toner on the photosensitive drum 2005. A front exposure lamp 2021 optically removes electricity from the photosensitive drum 2005. The transfer roller 2013 has driving means, which is shown as movable in the vertical direction.

The transfer roller 2013 is placed at the lower side shown by the solid line in FIG. 2 with keeping distance from the intermediate transfer member 2010 so as not to disturb the toner image, while four toner images are formed on the intermediate transfer member 2010, i.e., while the intermediate transfer member 2010 is rotating a plurality of rotations. After the four toner images are formed on the intermediate transfer member 2010, the transfer roller 2013 is placed at the upper side shown by the dotted line in FIG. 2 by cam parts (not shown), i.e., pressed to the intermediate transfer member 2010 via a transfer material 2027 with a predetermined pressure in synchronism with the color image being transferred on the transfer material 2027. At the same time, the transfer roller 2013 is applied with bias and a toner image on the intermediate transfer member 2010 is transferred to the transfer material 2027.

A transfer roller cleaner 2046 cleans the transfer roller 2013, if toner which is printed outside the size of transfer material from the intermediate transfer member 2010 puts on the transfer roller 2013. Around the intermediate transfer member 2010, there are provided an image formation start position detecting sensor 2044T for determining the position to start printing for image formation, a sheet feeding timing sensor 2044R for determining timing to feed a transfer material 2027, and a density sensor 2044C for measuring the density of a toner patch image for toner density control. To control the toner density, the density sensor 2044C measures a density of each toner patch image.

Next, the fixing device will be described in detail. A fixing device 2014 is for fixing a toner image transferred on the transfer material 2027 by heat pressing. The fixing device 2014 has a fixing roller 2015 for applying heat to the transfer material 2027 and a pressing roller 2016 for pressing the transfer material 2027 to the fixing roller 2015. The fixing roller 2015 and the pressing roller 2016 are hollow rollers, which include heaters 2017 and 2018 therein respectively. The fixing roller 2015 and the pressing roller 2016 transfer the transfer material 2027 when they are driven to rotate.

On a conveying path located upstream of the fixing device 2014, a transfer material determination sensor 2045 for automatically detecting the kind of transfer material 2027 and improving the fixability is disposed. By adjusting a time period for which the transfer material 2027 is passed through the fixing device 2014 according to characteristics (kind) of the transfer material 2027, the CPU 1033 of the printer controller 1031 changes a time period for conveying the transfer material 2027. On a conveying path located downstream of the fixing device 2014, a color sensor 3000 for detecting a trigger bar and a toner patch image formed on the transfer material 2027 is disposed. In response to an instruction from a user via an operation panel unit 1037, the CPU 1033 of the printer controller 1031 executes detection of a trigger bar and a toner patch image by the color sensor 3000, adjustment of the maximum toner density, and adjustment of gradation.

Figure 3:
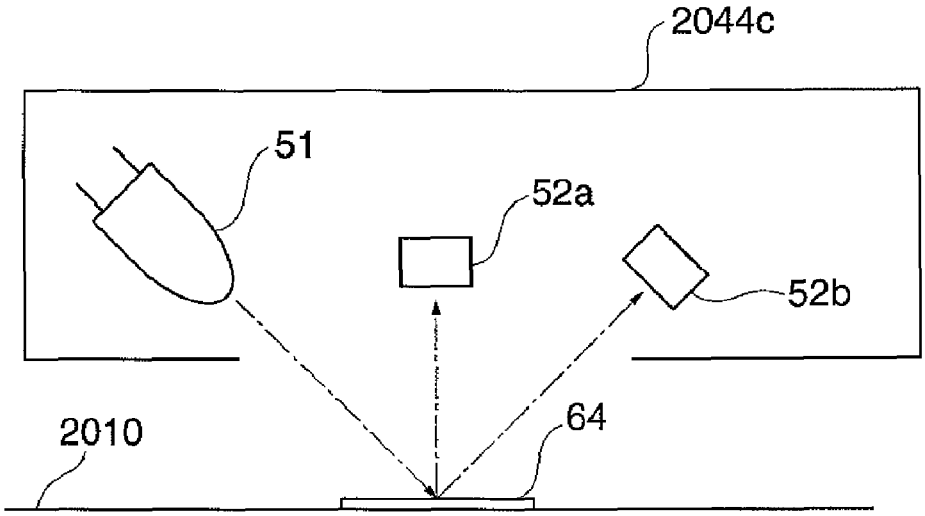
FIG. 3 is a diagram showing an example of an arrangement of a density sensor in FIG. 2.

FIG. 3 is a diagram showing an example of an arrangement of the density sensor 2044C in FIG. 2.

In FIG. 3, the density sensor 2044C is a sensor for detecting the density of a toner patch image 64. The density sensor 2044C includes an infrared light emitting element 51 such as LED, light-receiving elements 52a and 52b such as a photodiode and a CdS, an IC for processing light-receiving data (not shown), and a holder for accommodating the elements 51, 52a and 52b, and the IC.

The infrared light emitting element 51 irradiates infrared light to a toner patch image 64 formed on the intermediate transfer member 2010. The light-receiving element 52a detects a diffuse reflection light intensity from the toner patch image 64. The light-receiving element 52b detects a specular reflection light intensity from the toner patch image 64. The density sensor 2044C can detect the density of the toner patch image 64 varying from high to low by detecting both of the specular reflection light intensity and the diffuse reflection light intensity. Each of the light-receiving elements 52a and 52b converts the detected light intensity into a digital signal by using so-called A/D conversion (10 bits), which changes the output value according to the detected amount of light.

The CPU 1033 of the printer controller 1031 converts the digital signal into density information by using a brightness/density conversion table and executes various controls to be described below based on the density information, to thereby ensure color stability of an image to be transferred to the transfer material.

Figure 4A:
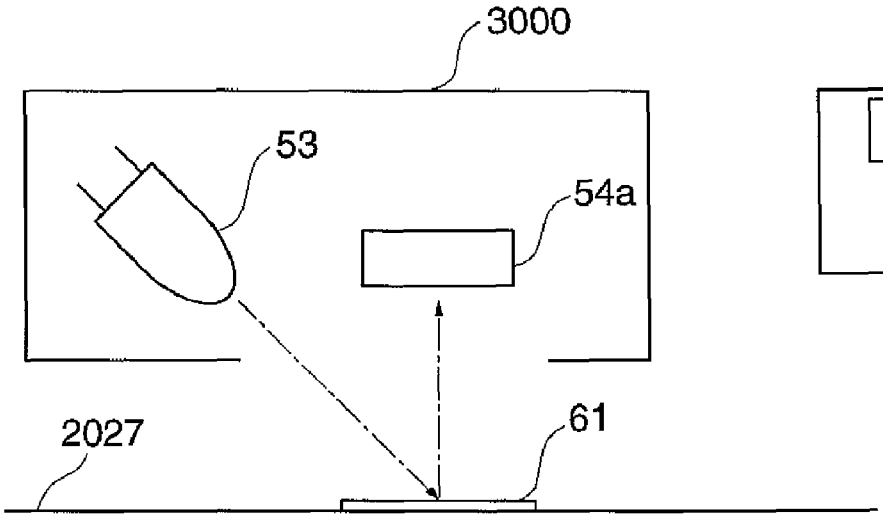
FIG. 4A is a diagram showing an example of an arrangement of a color sensor and FIG. 4B is a diagram showing an arrangement of a photoreceptor of a light-receiving element in the color sensor.
Figure 4B:
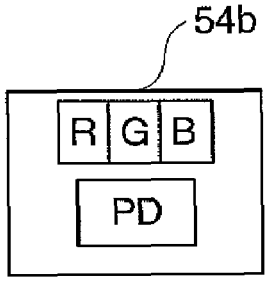

FIG. 4A is a diagram showing an example of an arrangement of the color sensor 3000 in FIG. 2, and FIG. 4B is a diagram showing a photoreceptor 54b of a light-receiving element 54a in the color sensor 3000.

In FIG. 4A, the color sensor 3000 is a sensor for reading a fixed toner patch image 61 formed on the transfer material 2027 and detecting an RGB output value. As shown in FIG. 4A, the color sensor 3000 includes a light emitting element 53 such as a white LED, a charge storage sensor with an RGB on-chip filter (not shown), a light-receiving element 54a such as a photodiode (PD) used for generating a trigger signal, and a holder accommodating the elements 53 and 54a, and the charge storage sensor.

In the color sensor 3000, the light emitted from the light emitting element (white LED) 53 enters the transfer material 2027, on which a fixed toner patch image 61 is formed, at an angle of 45 degrees with respect to the transfer material 2027, as shown in FIG. 4A. Then the color sensor 3000 detects diffuse reflection light intensity in the direction of 0 degree (in the North-South direction) by the light-receiving element 54a (charge storage sensor with RGB on chip filter). As shown in FIG. 4B, the photoreceptor 54b of the light-receiving element 54a is composed of independent RGB pixels.

The charge storage sensor forming the light-receiving element 54a can be a photodiode. Alternatively, the charge storage sensor can be an array in which several groups of three RGB pixels are arranged. Or, the color sensor 3000 can be adapted to have the angle of incidence of 0 degree and the angle of reflection of 45 degrees. Or, the color sensor 3000 may include an LED which emits light beams of three colors of RGB independently, and a charge storage sensor with no filter. The color sensor 3000 detects RGB output values of a toner patch image on the transfer material, and outputs the detected result to the printer controller 1031 that executes various types of image control.

Next, various types of image control in the image forming apparatus of the present embodiment with the above-mentioned arrangement will be described in detail with reference to FIGS. 1 to 9.

First, potential control in the image control will be described. The CPU 1033 of the printer controller 1031 in the image forming apparatus calculates the absolute moisture content based on a detected value of an environment sensor (not shown) placed in the casing 2001. Then, the CPU 1033 calculates the contrast potential between a charge potential (hereinafter referred to as Vd) and an exposure potential (hereinafter referred to as V1), which is the currently appropriate environmental contrast, based on the absolute moisture content. Further, the CPU 1033 carries out potential control so that the photosensitive drum 2005 has the calculated contrast potential. In the present embodiment, a potential control called two-point potential control is implemented.

Figure 5:
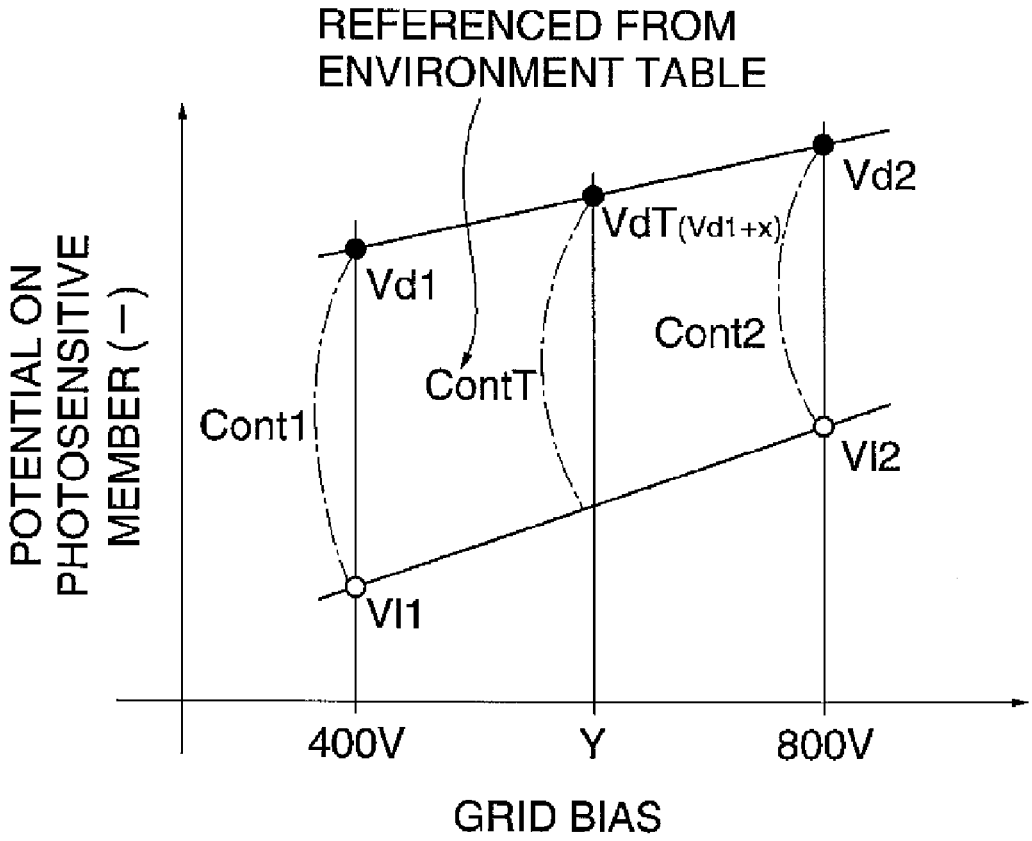
FIG. 5 is a diagram showing the concept of potential control of a photoconductive drum in FIG. 2.

FIG. 5 is a diagram showing the concept of potential control of the photosensitive drum 2005 in FIG. 2.

In FIG. 5A, Vd1 is a charge potential in a first charge potential condition (grid bias 400 V) and V11 is an exposing unit potential formed by standard laser power (hereinafter LPW). Vd2 is a charge potential in a second charge potential condition (grid bias 800 V) and V12 is an exposing unit potential formed by reference LPW for potential control.

The CPU 1033 of the printer controller 1031 calculates contrast potentials when the grid bias is 400 V and when the grid bias is 800 V, based on the difference between the charge potential and the exposing unit potential in the first charge condition (Vd1−V11) and the difference between the charge potential and the exposing unit potential in the second charge condition (Vd2−V12). Then, the CPU 1033 determines the grid bias, which attains the target contrast potential, by referencing an environment contrast table (not shown) previously registered in the program ROM 1034.

Expressions for determining grid bias will be shown below:

Calculate the contrast at 400 V (Cont1)=(Vd1−V11).

Calculate the contrast at 800 V (Cont2)=(Vd2−V12).

Calculate the amount of increase in Cont per increase in charge potential of 1 V (ContΔ)=[(Cont2−Cont1)/(Vd2−Vd1)].

Calculate X that satisfies ContT=Cont1+XContΔ by referencing the target contrast (ContT), which is illustrated in FIG. 5.

Target Td (VdT) is represented by X+Vd1.

Calculate a variation in charge potential per variation in grid bias of 1 V (VdΔ)=(Vd2−Vd1)/(800−400).

Calculate a grid bias (Y) that makes it possible to attain the target Vd (Y) from equation of target Vd=400+YVdΔ.

The CPU 1033 executes image formation at the engine unit 1036 by using the grid bias determined in the above manner. The CPU 1033 performs the image formation thereafter by use of a development bias (Vdc), which is predetermined potential different from the target Vd. Although the above-mentioned potentials in the photosensitive drum 2005 are each negative in sign, minus signs are omitted in the above expressions for simplification.

Next, the maximum toner density adjustment in the image control will be described. The CPU 1033 of the printer controller 1031 adjusts the maximum toner density using the grid bias and the development bias determined at the above-mentioned potential control. For a case where such toner density control is carried out for a printer which puts much weight on productivity, there has been proposed control for maximum toner density adjustment where only the potential control is performed, with the process mentioned below omitted. Since an amount of toner charge in the developing device (amount of electrical charge per unit weight) also varies according to environment or durability of toner, control based only on potential is low in accuracy.

In the present embodiment, the CPU 1033 executes a process for forming toner patch images on the intermediate transfer member 2010 while changing the LPW in stages, and transferring the toner patch images from the intermediate transfer member 2010, and determines LPW to be used for usual image formation. The process will be described with reference to FIG. 6.

Figure 6A:
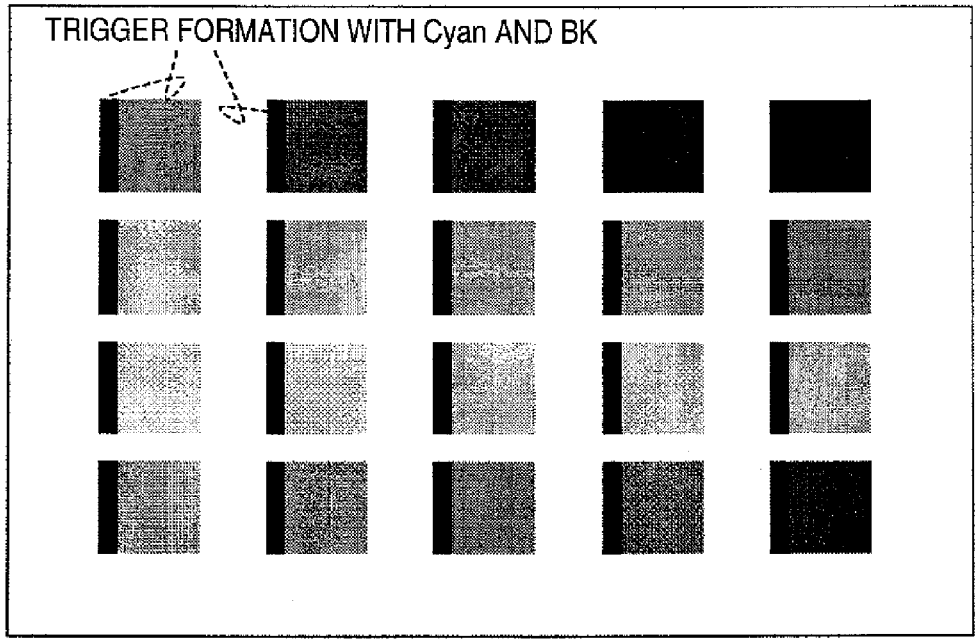
FIG. 6A is a diagram showing a maximum density adjustment pattern and FIG. 6B is a diagram showing outputs from a photoreceptor (photodiode) of a color sensor for BK parts of toner patch images.
Figure 6B:
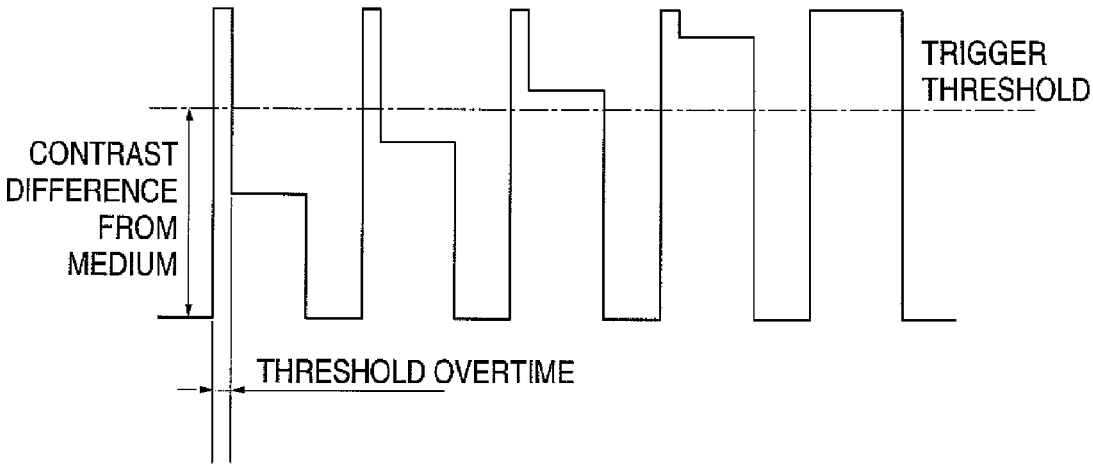

FIG. 6A is a diagram showing a maximum toner density adjustment pattern, and FIG. 6B is a diagram showing outputs from a photoreceptor 54a (photodiode) of the color sensor 3000 for BK parts of toner patch images.

For use in an adjustment of the maximum toner density based on the grid bias and the development bias which are determined by the above-mentioned potential control, the CPU 1033 of the printer controller 1031 forms toner patch images, five for each color of BK (black), C (cyan), Y (yellow), and M (magenta). These color images are arranged in the mentioned order as seen from above downwards in FIG. 6A. The five images for each color are formed using different conditions of LPW. LPW1, LPW2, reference LPW3 used for potential control, LPW4, and LPW5 that are used respectively for those as seen from the left rightwards in FIG. 6A. LPW5 provides image density higher than that provided by LPW1.

Figure 7:
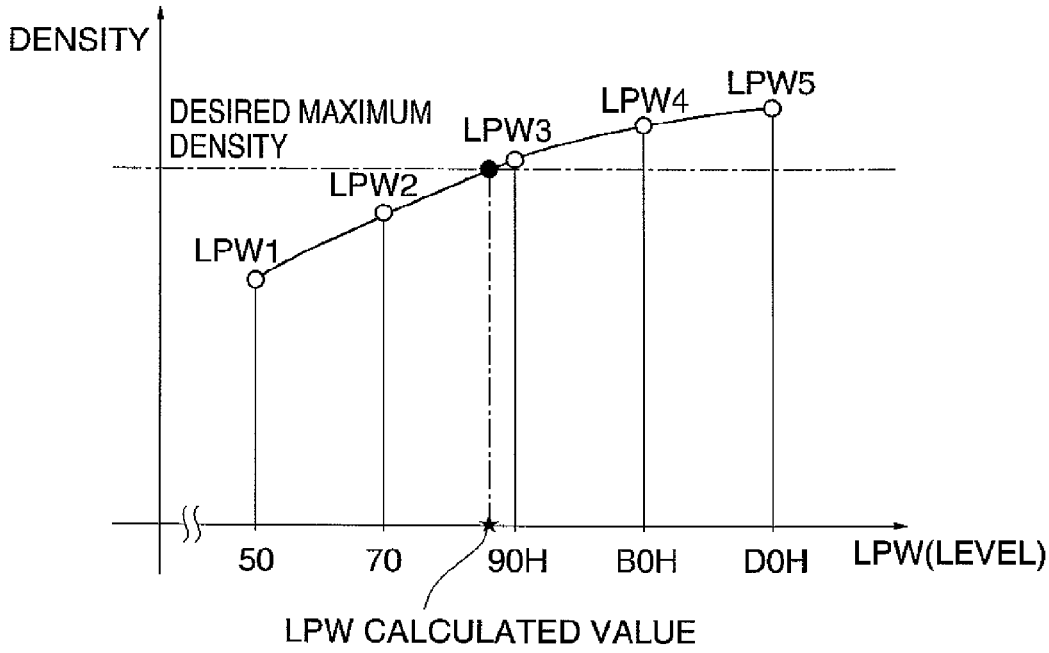
FIG. 7 is a diagram showing relationship between LPWs at the maximum density adjustment and toner densities detected by a density sensor from the toner patch images on a intermediate transfer member.

FIG. 7 is a diagram showing relationship between LPWs at the maximum toner density adjustment and toner densities detected from the toner patch images on the intermediate transfer member 2010 by a density sensor 2044C.

In FIG. 7, the CPU 1033 of the printer controller 1031 calculates an LPW that makes it possible to attain a desired maximum toner density based on the relationship between the LPWs at the maximum density adjustment and the toner densities detected from the toner patch images on the intermediate transfer member 2010 by the density sensor 2044C.

Next, gradation control in image control will be described. The gradation control is a control executed under a condition for attaining the maximum toner density (hereinafter referred to as the maximum density condition), such as grid bias, development bias, and LPW, which are determined prior to the gradation control. The CPU 1033 of the printer controller 1031 creates single-colored toner patch images that are different in gradation, subjects them to half-toning processing (also referred to as screen processing) to produce gray-level representation using lattices of points, outputs the result to the image forming unit (the engine unit 1036), and provides a toner density detection instruction. The image forming unit forms toner patch images on the intermediate transfer member 2010 based on the instruction, the density sensor 2044C detects the toner patch images, and the toner densities are calculated based on the detected result.

The CPU 1033 of the printer controller 1031 causes the density correction table creation unit 1045 to compare the densities of inputted image data before subjected to the half-toning processing and the densities of the toner patch images on the intermediate transfer member 2010, and create a density correction table (hereinafter referred to as LUT) so that an output image attains a desired density gradation. Usually, the CPU 1033 starts creating the LUT before subjected to the half-toning processing, and carries out the image formation while changing image data.

Next, setting control of the desired maximum density, which is the target of the maximum density control in image control, will be described with reference to a flowchart of FIG. 8. In the above-mentioned maximum density adjustment control, the LPW that makes it possible to attain the desired maximum density is determined. However, the desired maximum density specified by this LPW simply represents the maximum density of a toner patch image formed on the transfer material 2027 but not fixed thereto. Even if such LPW is determined by the maximum density adjustment control, therefore, only the desired maximum density for an unfixed toner patch image is detected, and image deterioration and the like caused in the next process of transferring or fixing are not considered as yet. Thus, appropriateness (desired maximum density) of the final output image cannot be guaranteed.

Therefore, the maximum toner density is adjusted here with use of fixed toner patch images formed on the transfer material 2027. In order to detect toner patch images fixed on the transfer material 2027, a color sensor 3000 is disposed on a conveying path located downstream of the fixing device 2014, as mentioned above.

Figure 8:
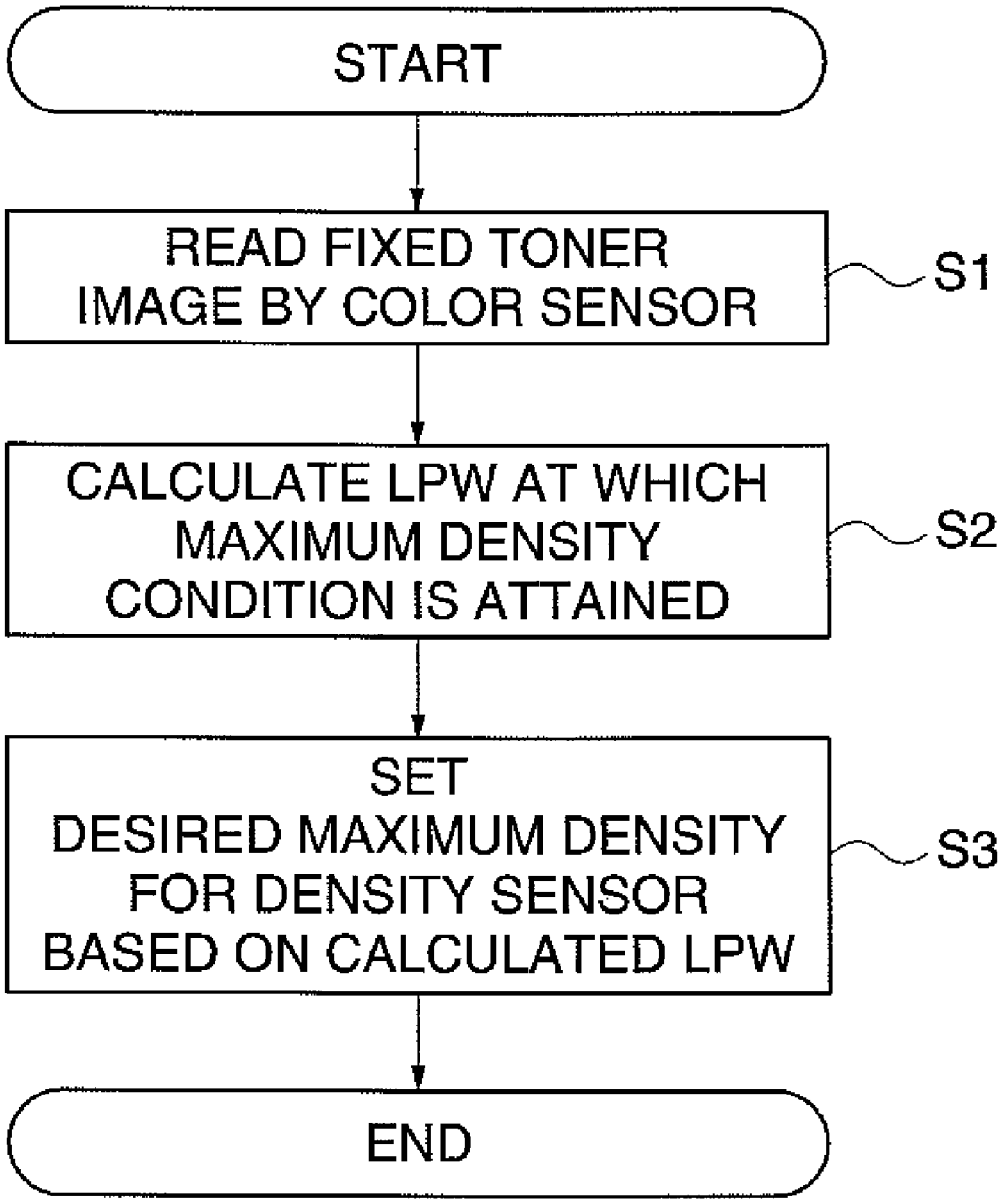
FIG. 8 is a flowchart showing process of setting the desired maximum density.

In FIG. 8, the CPU 1033 of the printer controller 1031 reads fixed toner patch images formed on the transfer material 2027 (step S1) by the color sensor 3000 and calculates an LPW which satisfies the predetermined maximum density condition (step S2).

For the calculation of LPW satisfying the maximum density condition, control is carried out, which is analogous to the maximum density adjustment control using the density sensor 2044C in that five LPWs are set. Specifically, toner patch images are created at five LPWs while changing the LPW, transferred to and fixed on the transfer material 2027, and detected by the color sensor 3000. Then, an LPW that provides a prescribed density is calculated, and the desired maximum density for a density sensor is set in accordance with the calculated LPW (step S3).

As described above, toner patch images are created on the transfer material 2027 in an LPW condition under which the maximum density can be finally determined, and detected by the color sensor 3000, and then the desired maximum density, which is the target of detection of the density sensor 2044C, is set. This makes it possible to absorb a variation in toner density due to deterioration of the transfer material 2027 and/or the fixing device 2014. The desired maximum density, which is the target of detection of the density sensor 2044C, is characterized by being set by use of the color sensor 3000, which can detect a toner patch image fixed on the transfer material 2027.

Figure 9:
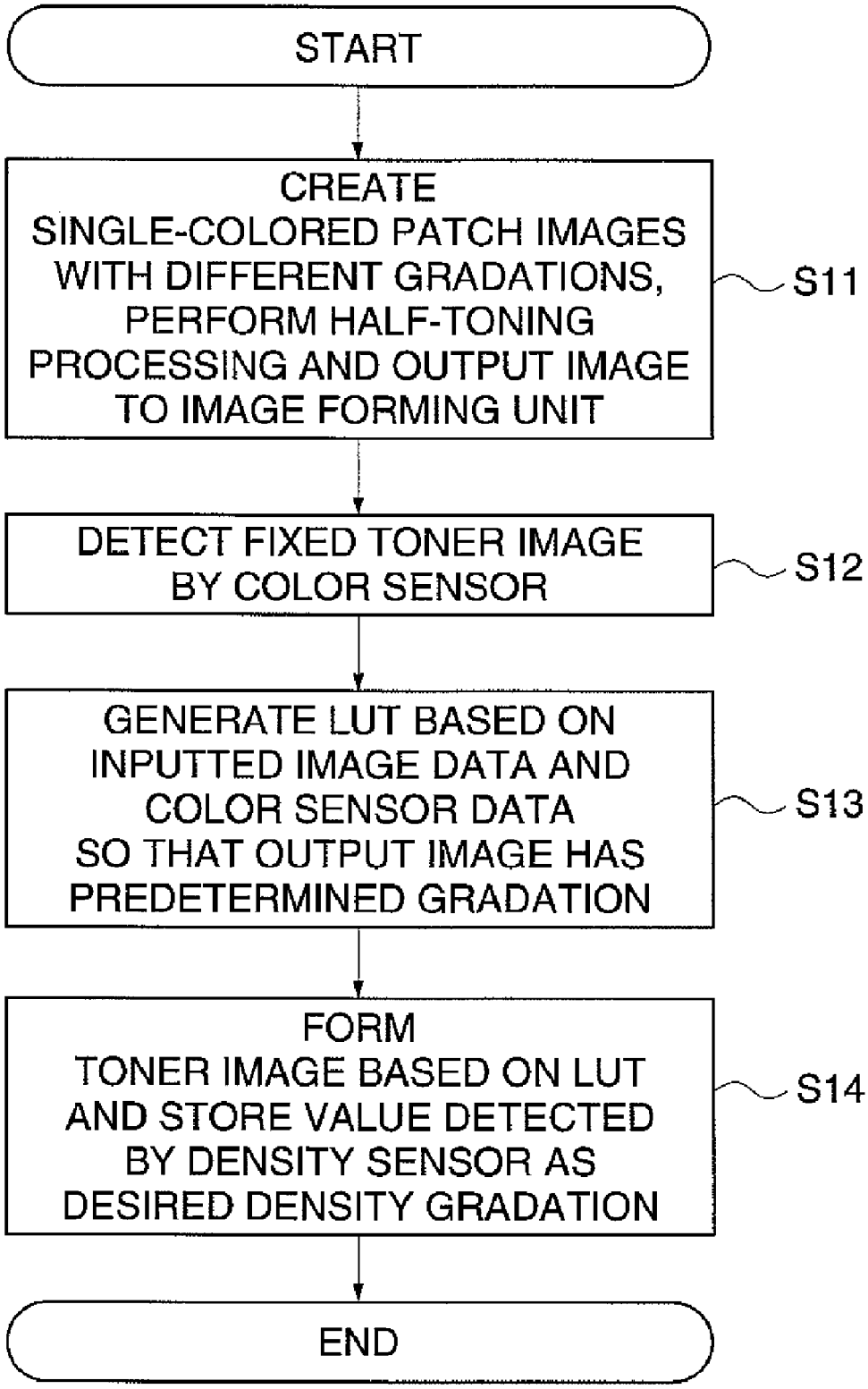
FIG. 9 is a flowchart showing process of setting the desired density gradation.

Next, setting control of the desired density gradation, which is the target of gradation control, will be described with reference to the flowchart of FIG. 9. The gradation control is executed by the printer controller 1031 to determine the desired density gradation as the target of gradation control, in which the density sensor 2044C detects the densities of toner patch images on the intermediate transfer member 2010.

The desired density gradation setting control is liable even in the halftone area to be affected by deterioration of the transfer material 2027 and/or the fixing device 2014, as in the desired maximum density setting control using the color sensor 3000. Therefore, the amounts of color materials (the amounts of toners which are image forming material) for keeping gradation of the toner patch image transferred on the transfer material 2027 constant must be determined. That is because the gradation may be changed from the desired density gradation (target of gradation control), if the gradation is adjusted solely based on unfixed toner patch images.

In the desired density gradation setting control, therefore, as in the above-mentioned gradation control, the CPU 1033 of the printer controller 1031 creates single-colored toner patch images with different gradations, performs half-toning processing on these images, and outputs the outcome to the image forming unit (the engine unit 1036) (step S11). Further, the CPU 1033 causes the image forming unit to transfer the single-colored toner patch images having different gradations from the intermediate transfer member 2010 to the transfer material 2027 and fixed thereon, and causes the color sensor 3000 to detect the images (step S12).

The CPU 1033 of the printer controller 1031 causes the density correction table creation unit 1045 to generate an LUT based on the inputted image data before subjected to the half-toning processing and the data detected by the color sensor 3000 so that the output image has a predetermined gradation (step S13). Here, the predetermined gradation indicates an color difference linear gradation which is described in Japanese Laid-Open Patent Publication (Kokai) No. 2003-324619.

The CPU 1033 of the printer controller 1031 registers the LUT in the density correction table storage unit 1050 to convert the gradation of output image into the predetermined gradation. Then, the CPU 1033 of the printer controller 1031 causes the image forming unit to form toner patch images on the intermediate transfer member 2010 based on the registered LUT, causes the density sensor 2044C to detect the densities of the toner patch images, and stores the densities in the RAM 1035 as the desired density gradations (step S14). The stored data is referenced as desired density gradation at usual image formation.

Even if the density sensor 2044C for detecting an unfixed toner image on the intermediate transfer member 2010 is used, by carrying out the above-mentioned desired maximum density setting and the desired density gradation setting, the same effects as those produced when the density control and the gradation control are performed based on results of detection of toner images on the transfer material transferred from the intermediate transfer member 2010 and fixed thereon. Thus, an image forming apparatus with high color stability can be provided.

The problem of the present invention relates to generation of read timing for when the color sensor 3000 reads a toner patch image on the transfer material, as mentioned above. More specifically, the problem is that the image density which triggers the read timing generation changes from an appropriate image density when a toner patch image is read for setting the desired maximum density. If the image density changes, neither the image density detection at specified timing nor even the image density detection can be carried out.

In order to solve the problem, in the present embodiment, an image forming condition is differentiated between a trigger bar and a toner patch image, so that a toner patch image can reliably be read by the color sensor 3000 without being affected by LPW, when the desired maximum density setting is performed. More specifically, the CPU 1033 of the printer controller 1031 sets the image forming condition of a trigger bar which is different from the image forming condition of a toner patch image, and then causes the engine unit 1036 to carry out image formation.

Now, a solution to the above-mentioned problem in the present embodiment will be described. The color sensor 3000 generates the read timing to read a toner patch image on the transfer material based on a trigger bar detection level by the color sensor 3000 and a trigger-bar passage time when the transfer material is conveyed, as shown in FIG. 6.

More specifically, when the transfer-material conveying speed is 200 mm/sec and the trigger bar width is 5 mm, characteristics of trigger bar detection, i.e., detection characteristics of the photoreceptor 54b (photodiode) of the light-receiving element 54a of the color sensor 3000 are as shown in FIG. 6B. What needed to be done is to calculate a threshold overtime which indicates a period of time in which a detection value of photodiode exceeds a trigger threshold (threshold for determining the detection of trigger bar), calculate a difference (contrast difference) between respective detection values for the trigger bar and the base (transfer material), and read a toner patch image in timing when several milliseconds has elapsed from the end of the above described time.

In the present embodiment, the above-mentioned trigger threshold is set to 2.5 V, which is a half the value of 5 V range. In this case, the same effect can be obtained by performing A/D conversion on the output from the photodiode and using the resultant digital value as the trigger threshold. If the trigger threshold is made lower, the frequency of false detection of trigger bar increases. If the trigger threshold is made higher, the trigger bar cannot be detected. Difficulty of setting the trigger threshold means that the trigger bar must be formed stable. Slight variation in the color density of trigger bar is directly linked to variation in read timing of toner patch image by the color sensor 3000.

In order to adjust the read timing of the color sensor 3000 by using such a trigger system, a trigger bar according to the present embodiment is characterized by being formed with use of a plurality of color materials. Since toner patch images for the maximum density adjustment are formed while changing the LPW in stages, as mentioned above, the density of each of trigger bars also varies. A trigger bar that is large in density does not cause substantial problems; however, a trigger bar that is small in density is difficult to be detected.

For the trigger bar that is small in density since it is formed using a low LPW such as LPW1 or LPW2 as shown in FIG. 7, the density of the trigger bar, when formed on the transfer material, is increased by additionally using one or more other color materials. This can prevent the color sensor 3000 from erroneously detecting a trigger bar formed using a low LPW and low in density.

Usually, BK (black) color material is used to increase contrast of a trigger bar against a white (transfer material). In the present embodiment, BK material is used as a basic color material of the trigger bar, and a Cyan material, low in lightness next to BK material, is also used. Even if a trigger bar is formed using a low LPW, with the arrangement where two color (Cyan and BK) materials are formed in layer as color material for such a trigger bar so that a detected value of the trigger bar exceeds a trigger threshold, it is possible to prevent erroneous trigger bar detection by the color sensor 3000. This arrangement can also widen a range for setting the maximum density by further lowering a lower one among LPWs used for trigger bar formation, thereby attaining much higher accuracy in trigger bar detection.

In the present embodiment, two color (Cyan and BK) materials are used for formation of trigger bars corresponding to LPW1 and LPW2 which are lower than reference LPW3 at the maximum density setting. That is because it can also prevent failed fixing of trigger bars. If BK and Cyan materials are put on a trigger bar when formed using LPW5, which is the maximum LPW in terms of thermal capacity, the amount of toner to be put on the trigger bar corresponding to LPW5 exceeds 300%, if 100% represents the amount of toner put on the trigger bar at a usual maximum density. Due to the arrangement of the fixing device 2014, most image forming apparatuses have a limit around 250% with respect to the amount of toner. Also in the present embodiment, the maximum amount of toner put on the trigger bar is up to 250%.

From the above viewpoints, a trigger bar corresponding to LPW4 or LPW5 needs not be formed by two color materials. Rather, a risk increases when the trigger bar is formed by two color materials. Further, the reference LPW3 calculated based on an environment contrast table is an LPW setting value which can be considered as producing a desired density. According to experiments performed by the inventors and others, there were few cases in which detection of the color sensor 3000 was not triggered by a trigger bar formed using the reference LPW3. If detection of the color sensor 3000 is not triggered by any trigger bar corresponding to the reference LPW3, the environment contrast table needs to be checked. From the above-mentioned background, an arrangement is resulted in which two color materials are used to form trigger bars corresponding to LPW1 and LPW2 which are lower than the reference LPW3.

Although depending on a type of a light-receiving element of a color sensor for detecting a trigger bar formed on a transfer material, a photodiode, which is used as a light-receiving element of the color sensor 3000 in the present embodiment, can operate without any problems, if the color material is not more than 20 in lightness. Even if the kind of a color material changes, the color sensor 3000 can prevent false detection just by forming a trigger bar by using a color material whose lightness is not more than 20 in terms of the contrast against the transfer material. The term "lightness" means L* (ell-star) stipulated by the CIE (Commission Internationale de l'Eclairage).

With the above-mentioned arrangement, it is possible to generate highly accurate read timing for when the color sensor 3000 reads a toner patch image formed on the transfer material using an LPW set at the maximum density adjustment. This ensures color stability of printout images by the image forming apparatus.

In the present embodiment, although problems caused by a trigger bar corresponding to a low LPW in an image forming apparatus is described, an inkjet image forming apparatus also encounters a case where a single color material is not enough to raise the toner density to the maximum density depending on surrounding conditions of the image forming apparatus or durability of toner. In such a case, method of using a trigger bar formed with several color materials in the present embodiment are effective.

In the present embodiment, as the color material lower in lightness next to BK color material, only the Cyan color material is available and thus the Cyan color material is set as the second color material for forming the trigger bar. If a particular color material low in lightness other than Cyan such as BLUE is available, it is preferable to use such a color material.

As described above, according to the present embodiment, the image forming condition of a trigger bar that causes the color sensor 3000 to generate read timing of a toner patch image is set so as to be different from the image forming condition of a toner patch image. More specifically, the trigger bar forming condition is as follows: the trigger bar is formed to have a lightness not higher than a predetermined lightness; the trigger bar is formed using a color material different from that used for formation of the toner patch image; the trigger bar is formed using a color material whose maximum amount per unit area is different from that for formation of the toner patch image; or the trigger bar is formed using a plurality of color materials selected in the order of low to high lightness. This enables the color sensor 3000 to generate highly accurate read timing of toner patch image. In this manner, a toner density adjustment with high accuracy can be realized. As a result, the present embodiment can improve color stability in the image forming apparatus.

In order to determine the maximum toner density, the present embodiment forms a plurality of toner patch images on a transfer material by changing the LPW in stages, and determines the LPW that makes it possible to attain the maximum density based on the detected result by the color sensor 3000, whereby the toner patch image is ensured to have the required lowest lightness. Therefore, the color sensor 3000 can generate accurate read timing of toner patch image without being affected by characteristics of an edge part of the toner patch image. Hence, highly accurate toner density adjustment can be realized, and color stability in the image forming apparatus can be improved.

Now, the second embodiment of the present invention will be described.

The second embodiment differs from the first embodiment in that the determination method of the maximum density is changed from the LPW method to a PWM (Pulse Width Modulation) method. The other elements of the present embodiment are the same as their counterparts in the first embodiment (FIG. 1 to FIG. 4), and thus the description on them will be omitted.

In the first embodiment, a method for determining the maximum density is described in the case where the LPW is differentiated stepwise in five stages, toner patch images are transferred on a transfer material and read by the color sensor 3000, and the printer controller 1031 calculates, based on the read result, the LPW that makes it possible to attain the desired maximum density.

On the other hand, many image forming apparatuses do not have a circuit for changing the LPW in consideration of cost. As a method of determining the maximum toner density in such image forming apparatuses, it is usual to control toner density by changing the degree of PWN modulation of laser (laser pulse width) applied to the photoconductive drum. The problem occurs here in that, if a trigger-bar forming condition is changed with a change in the PWM condition for toner density control, the trigger bar does not serve as an accurate trigger to cause the color sensor 3000 to read a toner patch image.

Thus, in the present embodiment, the above-mentioned problem is solved by forming toner patch images used for maximum density calculation with use of the desired PWM varying stepwise and by forming a trigger bar image with use of a predetermined PWM (with the laser fully on).

The present embodiment is characterized in that the toner patch image forming condition is differentiated from the trigger bar image forming condition.

Although in the present embodiment an electrophotography image forming apparatus has been explained, the present invention is not limited thereto. An ink jet image forming apparatus can also be configured to accurately read toner patch images by differentiating the image forming condition between a toner patch image and a trigger bar as mentioned above. By way of example, such image forming condition is as follows:

(1) A toner patch image forming unit performs one-way printing (in which an ink head is moved in one direction), whereas a trigger bar forming unit performs a two-way printing (in which the ink head is moved bidirectionally) to increase the density; and/or (2) The toner patch image forming unit performs printing in a usual resolution (at a usual sheet feed speed), whereas the trigger bar forming unit performs printing in higher resolution (at a reduced sheet feed speed); and/or (3) The toner patch image forming unit performs printing in usual density and the trigger bar forming unit performs printing by increasing the ink discharge amount.

With the above condition, the toner patch image forming unit and the trigger bar forming unit can optimally be operated independently of each other, whereby the color sensor 3000 is enabled to generate accurate read timing of toner patch images, thus improving the color stability in the image forming apparatus.

As described above, according to the present embodiment, for the determination of maximum toner density, the toner patch images are formed by use of laser that is modulated with a desired degree of PWM modulation varying stepwise in stages, and on the other hand, the trigger bar is formed by use of laser modulated with a predetermined degree of PWM modulation. Thus, the toner patch image is ensured to have the required lowest lightness, and the color sensor 3000 can generate an accurate read timing of toner patch image without being affected by characteristics of an edge part of the trigger bar. This enables a highly accurate toner density adjustment. As a result, color stability can be improved in the image forming apparatus.

Next, the third embodiment of the present invention will be described.

The third embodiment differs from the first embodiment in that, based on a recognition that an edge part a trigger bar is important in generating an accurate image read timing, a reliable edge part is formed in the trigger bar.

The other elements of the present embodiment are the same as their counterparts in the first embodiment (FIG. 1 to FIG. 4), and thus the description on them will be omitted.

Figure 10:
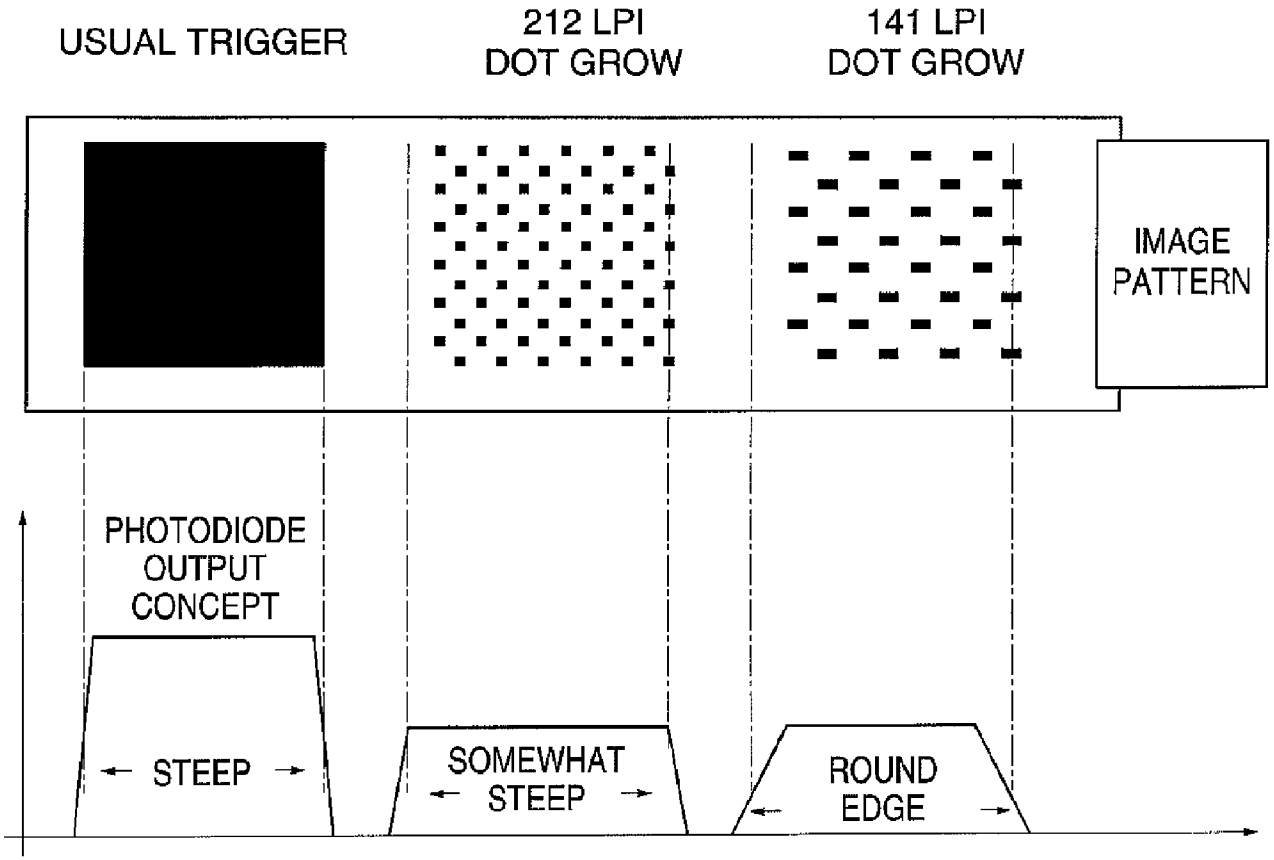
FIG. 10 is a diagram showing kinds of a toner patch image and outputs from a photoreceptor (photodiode) of a color sensor according to a third embodiment of the present invention.
Figure 11A:
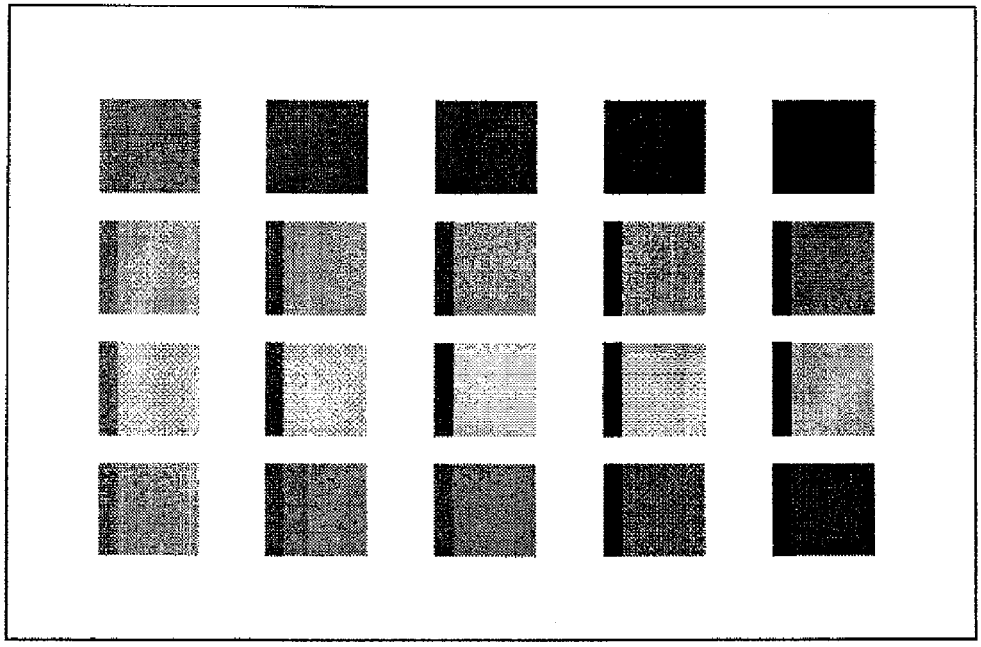
FIG. 11A is a diagram showing the maximum density adjustment pattern according to a conventional example and FIG. 11B is a diagram showing outputs from a photoreceptor (photodiode) of a color sensor for BK parts of toner patch images.
Figure 11B:
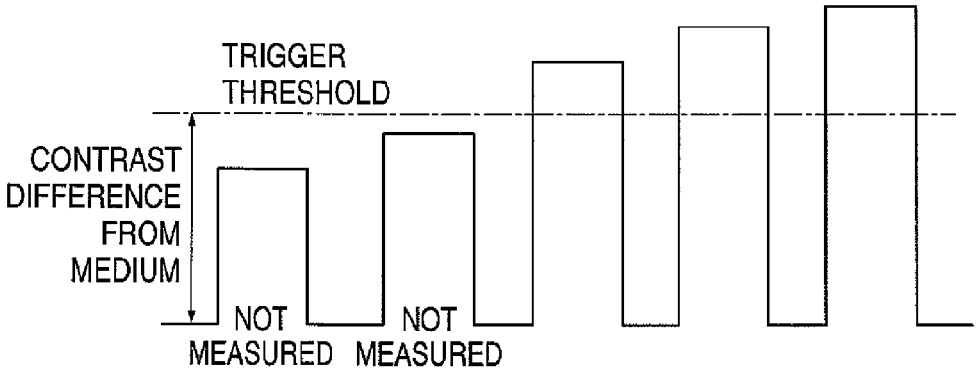

FIG. 10 is a diagram showing kinds of toner patch image and outputs from a photoreceptor 54a (photodiode) of a color sensor 3000 according to the present embodiment.

In FIG. 10, three kinds of toner patch image formed on the transfer material are shown, for example. In the category of low-priced image forming apparatuses, some of them can change neither the level of LPW nor the degree of PWM modulation. Such types of image forming apparatus generally utilize a method for defining the maximum toner density by referring to an LUT not having been subjected to half-toning processing.

If the maximum density is determined for all the images including trigger bar images based on the LUT before subjected to the half-toning processing, however, a sensor output (photodiode output) rises less steeply at the leading edge part of the trigger bar, as shown in the right part of FIG. 10. Therefore, it is impossible to generate accurate trigger that causes the color sensor 3000 to read a toner patch image. Generally, the lower the cost of the image forming apparatus, the less dense the number of lines (LPI) with which the half-toning is performed to suppress variations in the image forming unit. The less dense the number of lines that determines the density of the trigger bar, the higher the chance of occurrences of problems such as an erroneous operation or wrong timing of the color sensor 3000.

In the present embodiment, a toner patch image and a trigger bar are formed as described below in order to prevent the above-mentioned problem. That is to say, an image forming apparatus according to the present embodiment, which adjusts the maximum toner density based on image data, is characterized by comprising an arrangement that is designed so as not to adjust, based on the image data, the maximum toner density of the trigger bar that triggers the color sensor 3000.

To attain the above-mentioned arrangement, a system is needed in which a patch generation unit 1044 of the printer controller 1031 performs half-toning processing on the maximum density adjustment pattern but does not perform half-toning processing on the trigger bar, i.e., a system of combining the maximum density adjustment pattern after subjected to the half-toning processing with the trigger bar. Such a system is stored in the patch generation unit 1044.

If a printer controller can switch screens (image processing patterns) between a character image and a photograph image (assuming for example that the number of dots forming a character image is 212 LPI dots and the number of dots forming a photograph image is 141 LPI dots), it is simple and the most effective to inform the engine unit that the trigger bar is embedded with character information. By embedding the character information in the trigger bar, an image processing pattern of a trigger bar is set to have the number of lines (LPI) that is larger than that of the image processing pattern of a toner patch image. Image data for maximum toner density adjustment may be set fixedly and linearly, whereas an LUT for character information may be set to have any arbitrary characteristics (curve) irrespective of the image data setting.

On the other hand, considering characteristics of the edge part of a trigger bar in an ink jet image forming apparatus, a trigger bar thereof need to be formed based on a conversely different technical concept from that for a trigger bar of an electrophotography image forming apparatus. If quality paper instead of coat paper is used as adjustment sheet in the ink jet image forming apparatus, there occurs a bleed, which is a blur between ink spots, or a blur due to ink absorption by a sheet. That is to say, a trigger bar image with unclear edge parts is resulted, so that errors are caused in reading timing of the color sensor 3000.

In the case of an ink jet image forming apparatus of a type having both of the pigment type BK ink and the dyestuff type BK ink, the above-mentioned problem can be solved by forming a trigger bar with use of the pigment type ink, even when a photograph image is to be adjusted in density (the dyestuff type BK ink is usually used for photograph image).

In the case of an ink jet image forming apparatus of a type having only the dyestuff type BK ink, blurs are caused when the maximum amount of ink is discharged. Thus, control is performed to thin out intervals of dot prints to an extent that accurate trigger is generated that causes the color sensor 3000 to read a toner patch image. This increases accuracy in detecting an edge part of a trigger bar.

When the density adjustment for photograph image is performed by using quality paper on which blurs may occur, as adjustment sheet, lightness of the color material used for the trigger bar is sometimes lower than the lowest lightness condition, so that no appropriate trigger causing the color sensor 3000 to read the toner patch image is generated. Even in such cases, it is possible to carry out the density adjustment by changing the adjustment paper sheet from the quality paper to coat paper. That is to say, an arrangement may be adapted to inform a user of changing of the adjustment sheet via the operation panel unit 1037.

As mentioned above, according to the present embodiment, an image of a trigger bar is formed in accordance with an image processing pattern different from that in accordance with which a toner patch image is formed, and if both of the pigment type BK ink and the dyestuff type BK ink are installed in the image forming apparatus, an image of a trigger bar is formed by an ink of a type (pigment type) different from that for the toner patch image. That can cause the color sensor 3000 to generate highly accurate read timing of a toner patch image, to achieve a highly accurate toner density adjustment, whereby color stability in the image forming apparatus can be improved.

It is to be understood that the object of the present invention may also be accomplished by supplying a system or an apparatus with a storage medium in which a program code of software, which realizes the functions of either of the above described embodiments is stored, and causing a computer (or CPU, MPU and the like) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Examples of the storage medium for supplying the program code include a floppy (registered trademark) disk, a hard disk, a magnetic-optical disk, an optical disk including a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

The form of the program may be an object code, a program code executed by an interpreter, or a script data supplied to an OS (Operating System).

This application claims the benefit of Japanese Application No. 2005-057745, filed Mar. 2, 2005, which is hereby incorporated by reference herein in its entirety.

What is claimed is:

[1. An image forming apparatus comprising:

an image forming device that forms, on an image bearing member, an image with a plurality of materials, a patch image for detecting density of the image, and a trigger image to be detected to generate a trigger to read the patch image, wherein the patch image is formed with a first material among the plurality of materials and the trigger image is formed with a second material, which is different from the first material, among the plurality of materials;

a reading device that reads the patch image based on the trigger generated by detecting the trigger image; and a controlling device that controls the density of the image formed by said image forming device based on the patch image read by said reading device, wherein a brightness of the trigger image formed with the second material is lower than that of the patch image formed with the first material.]

[2. An image forming apparatus according to claim 1, wherein the plurality of materials include black, cyan, magenta, and yellow materials, and the second material that forms the trigger image is the black material.]

[3. An image forming apparatus according to claim 1, wherein the trigger image is further formed with at least one of the plurality of materials other than the black material in addition to the black material.]

[4. An image forming apparatus according to claim 1, wherein each of the first material and the second material comprises a toner.]

[5. An image forming apparatus according to claim 1, wherein images formed by developing electrostatic latent images are transferred to the bearing member as the patch image and the trigger image.]

[6. An image forming apparatus according to claim 1, wherein the bearing member is a sheet on which the image is to be recorded.]

7. An image forming apparatus comprising:

an image forming device that forms, on an image bearing member, an image with a plurality of materials, a patch image for detecting density of the image, and a trigger image to be detected to generate a trigger to [read] *detect* the patch image, wherein [the patch image is formed with a first material among the plurality of materials, and] the trigger image is [formed with] *composed of a*

*combination of at least a first material, which is* a black material[, which is one of] *included in* the plurality of materials *and a second material included in the plurality of materials and is different from the first material*;

a [reading] *detecting* device that [reads] *detects density of* the patch image based on the trigger generated by detecting the trigger image; and a controlling device that controls [the] *a* density of the image formed by said image forming device based on *the density of* the patch image [read] *detected* by said [reading] *detecting* device.

8. An image forming apparatus according to claim [7] *12*, wherein *the second material of* the trigger image is [further formed with at least one of the plurality of materials other than the black material in addition to the black material] *the cyan material*.

9. An image forming apparatus according to claim 7, wherein [each of] the plurality of materials [comprises a] *are* [toner] *toners*.

10. An image forming apparatus according to claim [7] *9*, wherein [images,] *the image, the patch image, and the trigger* formed by developing *an* electrostatic latent [images] *image* are transferred to the bearing member [as the patch image and the trigger image].

11. An image forming apparatus according to claim 7, wherein the bearing member is a sheet on which the image is to be recorded.

*12. An image forming apparatus according to claim 9, wherein the plurality of materials include black, cyan, magenta, and yellow materials.*

*13. An image forming apparatus according to claim 7, wherein the detecting device detects the trigger image and generates the trigger based on the detection of the trigger image.*

* * * * *